United States Patent [19]
Plavidal et al.

[11] Patent Number: 5,462,080
[45] Date of Patent: Oct. 31, 1995

[54] HEATED REMOVABLE THROTTLE VALVE

[75] Inventors: Richard W. Plavidal, Los Gatos; Petru N. Nitescu, Milpitas; Greg Mudwilder, San Jose; Richard Crockett, Milpitas, all of Calif.

[73] Assignee: Applied Materials, Inc., Santa Clara, Calif.

[21] Appl. No.: 114,893

[22] Filed: Aug. 31, 1993

[51] Int. Cl.$^6$ ................................................. F16K 49/00
[52] U.S. Cl. .......................... 137/337; 137/341; 137/315; 137/550; 251/129.11
[58] Field of Search .............................. 251/129.11, 306; 137/454.2, 315, 341, 337, 550

[56] References Cited

U.S. PATENT DOCUMENTS

| | | | |
|---|---|---|---|
| 1,006,244 | 10/1911 | Low | 137/341 |
| 3,127,904 | 4/1964 | Stillwagon | 137/315 |
| 4,079,747 | 3/1978 | Roberts | 137/375 |
| 4,085,774 | 4/1978 | Baumann | 137/625.3 |

FOREIGN PATENT DOCUMENTS

| | | | |
|---|---|---|---|
| 2418600 | 2/1978 | France. | |
| 2672657 | 2/1991 | France. | |
| 3819301 | 12/1989 | Germany | 137/315 |

OTHER PUBLICATIONS

IBM Technical Bulletin 2712, vol. 16, No. 8, Jan. 1974.

Primary Examiner—A. Michael Chambers
Attorney, Agent, or Firm—Janis Biksa

[57] ABSTRACT

A two piece throttling valve is disclosed. The valve assembly includes a stationary outer housing with an inner removable operable assembly. In this configuration the piping (pump stack) does not have to disassembled to remove, clean or replace the internal valve pieces or the in-line screen. The inner assembly can be quickly removed for cleaning. The entire valve assembly is heated to reduce deposition of volatile process byproducts on the internal valve surfaces and reduce the cleaning frequency. A wedge plate is provided in the outer stationary valve housing to mate with a sloped bottom surface of the inner valve housing such that when the inner assembly is in position in the outer valve housing there is a tight fit between adjacent sealing surfaces around the valve bore. A single flat surface seal provides vacuum sealing between the inner assembly and outer housing. A dual valve stem (shaft) seal seals the valve shaft. The seal includes an inner O-ring made of a chemically resistant material and an outer O-ring that is less chemically resistant, but has a dual-quad profile to prevent vacuum leakage. A screen in the fluid passage adjacent to and supported by the outer housing can easily be accessed from the inside of the outer housing.

13 Claims, 9 Drawing Sheets

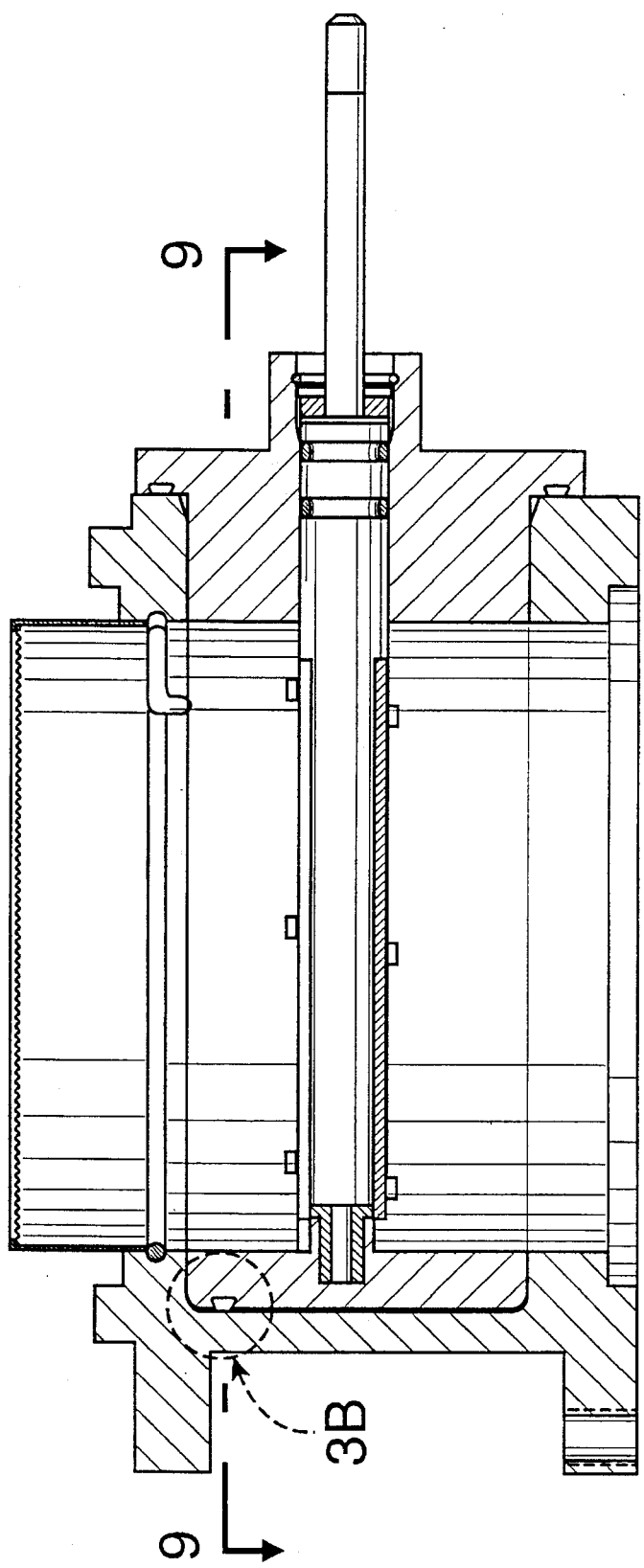
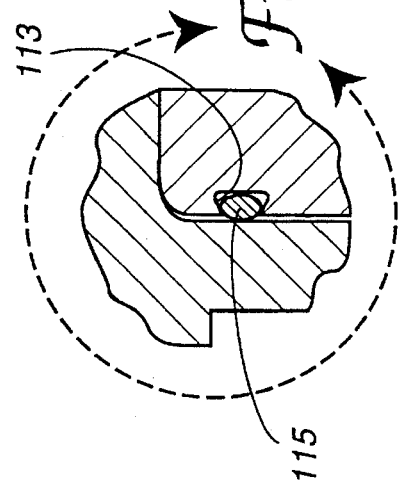
*Figure 3A*
*Figure 3B*

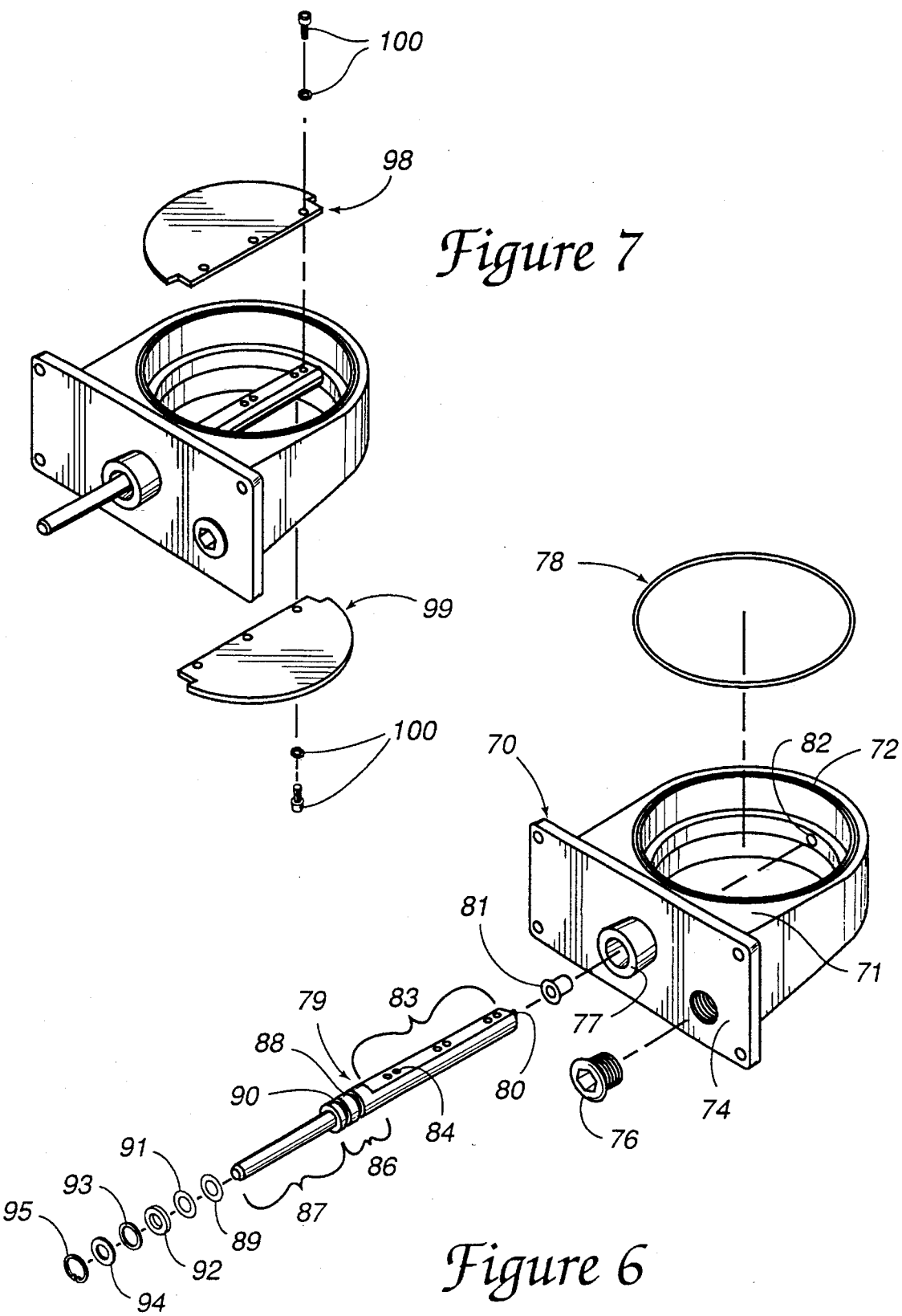

HEATED REMOVABLE THROTTLE VALVE

FIELD OF THE INVENTION

This invention relates to throttling valves used in low pressure (vacuum) systems used to achieve and maintain process conditions for processing semiconductor wafers.

BACKGROUND OF THE INVENTION

In plasma metal etch processing, (a typical arrangement is shown in FIG. 2), the process chamber 20 is connected by vacuum piping to a vacuum system including: a screen 56, a throttling valve assembly 24, a gate valve 26, a turbo (booster, turbo molecular) vacuum pump 28, and an isolation valve 30 connecting to main vacuum pumps (in the direction of the arrow 32). The throttling valve assembly 24 is generally a butterfly type throttling valve installed in the exhaust gas line between the process chamber 20 and the vacuum pumps. The throttling valve regulates the pressure in the etch process chamber 20. Gases used in the process chamber often produce etch byproducts, e.g., $Al_2Cl_3$, polymeric reaction products. These reaction products are drawn into the vacuum piping and rapidly condense on and coat the throttling valve tending to create particulates that have been found to contaminate the wafer in the process chamber.

To maintain chamber particle contamination at acceptable levels the heavy polymer deposits on the throttling valve must be removed. Considerable time (several hours) must be spent removing and cleaning the throttling valve. The throttling valve is an integral part of the process chamber vacuum piping. To remove and clean the throttling valve, the piping adjacent the valve must be disturbed, if not completely disassembled, to permit the throttling valve to be removed. Each removal, cleaning, and reassembly cycle increases the possibility of damaging the piping or the valve and creating a vacuum leak.

The deleterious effect of particulate contamination on the processing chamber and wafer(s) being processed due to polymer buildup is unacceptable. Repeated breach of the vacuum system to remove, clean and reinstall the throttling valve is a very burdensome and time consuming procedure when the piping (pumping stack or pumping system) has to be disturbed or disassembled for each cleaning. It reduces the process chamber throughput (increases production system downtime) and creates a higher risk of component damage.

SUMMARY OF THE INVENTION

This invention provides a two piece throttling valve assembly which allows quick removal of the valve internals for cleaning and heats the entire valve assembly to reduce the polymer deposition rate and cleaning frequency. A stationary outer valve housing is permanently mounted in the vacuum piping (pump stack) between the process chamber and the vacuum pumps. The outer housing is open on one side. The outer housing can be cleaned of any polymer deposited in the housing without removing the housing from the system through its side opening. The side opening also receives and seals an inner valve assembly. The inner valve assembly includes a plug having a hollow cylinder containing valve flappers on a valve stem (shaft) to act as a butterfly type throttling valve. The side opening of the outer valve housing is sealed by the valve stem seal and an O-ring seal around the flange of the inner housing (plug) when the inner assembly and outer housing are assembled.

The outer housing is heated with thermostatically controlled electrical heaters. Heat from the heaters raises the temperature of the inner assembly including the valve flappers to prevent or reduce the rate of etch byproduct (polymer) deposition on the inside surfaces of the throttling valve assembly, especially the flapper surfaces. A minimum valve surface temperature of approximately 85° C. is maintained on internal surfaces when the outer housing temperature controls are set to maintain 95° C. At this temperature and an operating pressure range of 10–30 milliTorr above the process chamber pressure, most of the etch byproducts, notably $Al_2Cl_3$, are prevented from depositing on internal surfaces.

The inner housing assembly includes a flanged housing (plug) having a hollow cylinder corresponding to the valve bore. A valve stem passes through the plug and pivots about its axis in the center of the bore. A set of two symmetrical butterfly valve flappers are attached to the stem (shaft) on opposite sides of it within the bore. The valve stem (shaft) is equipped with a dual shaft seal to prevent vacuum leaks into the throttling valve internals which can cause particulate contamination on the wafer being processed. The seal consists of two discrete seal elements. The inner seal is a standard configuration O-ring made of very chemically resistant material, such as Kalrez or Chemraz to prevent corrosive chemicals from reaching the outer seal. The outer seal, made of Viton is a special profile O-ring called a quad-seal and is the principal vacuum seal.

The inside of the stationary outer valve housing includes an inner top surface generally parallel to an inner bottom surface. The inner housing has a flat top surface and a tapered bottom surface. A wedge plate having a tapered planar top surface is inserted and mated to the inner bottom surface of the outer housing. The bottom surface of the inner housing is tapered at an angle parallel with the top of the wedge plate. As the inner housing is inserted into the outer housing the wedge plate elevates the inner housing into its operating position in contact with the inner top surface of the outer housing. The bore openings through the wedge plate, internal housing, and outer housing all line up when assembled in their operating positions. A relatively tight fit between pieces is required to prevent gas "blow-by" around the inner housing. The tight fit between the inner and outer housing may or may not be sealed with an O-ring seal. The use of the wedge plate allows for free travel of the inner housing into the outer housing, until the approximately last ¼" (6.35 mm) of travel is reached. The final approximately ¼" (6.35 mm) of movement seats the housing and compresses an O-ring seal (if installed) 0.010 inches (0.254 mm).

In an alternate embodiment, the inner housing bottom surface is not tapered. An open ended O-ring or other shaped cross section type seal seals the radial space between the inner housing and the outer housing. The ends of the open ended seal are captured in the face of the side opening in an appropriate cross section retention groove on the side of the removable housing (plug). This seals all around the side surface of the plug. The ends of the open ended O-ring type seal are captured in seal termination holes (cavities to host the end of the O-ring type seal no matter what cross sectional shape is used) in the inner face of the flange of the inner housing. The flange seal O-ring and groove are immediately adjacent to the seal termination hole and open ended O-ring and provide a tight vacuum seal to atmosphere, while the clearance between the open ended O-ring and the seal termination hole can provide a tight seal when the component dimensions are matched properly. The preferred location of the side sealing groove is toward the top of the inner housing (to reduce gas intrusion between the two housings). In this case, no wedge bottom and wedge plate are needed. The sealing is determined by the compression of the side open ended O-ring when the plug is fully inserted in and actually forced inside the outer housing by the flange screws.

A screen assembly is supported by the outer housing. A perforated section of the assembly is supported above the bore of the valve by a cylindrical screen skirt resting on a wire retainer. The screen discourages plasma formation within the valve and stops and retains any foreign objects falling from the process chamber towards the vacuum system. Normally such a screen would also have to be accessed by disassembling the piping (pump stack). In this instance the screen is a loose fit in the valve bore and is retained by a retainer wire fitted in an internal groove of the outer valve housing. Once the inner housing and the screen wire retainer of the valve are removed, the screen assembly can pass through the bore of the valve to also be removed through the outer housing side opening without disturbing the piping.

This throttling valve assembly reduces the level of particulates in a wafer processing chamber by reducing the chance of polymer (or other process byproducts) condensation. It provides a very fast and easy way to access the internal valve pieces for removal, cleaning, and/or replacement. It simplifies access to the vacuum system protecting screen. And its valve stem (shaft) seal configuration provides a chemically resistant vacuum tight seal.

BRIEF DESCRIPTION OF THE DRAWINGS

FIG. 1A is an exploded perspective view of another example of a heated throttle valve according to the invention;

FIG. 3A is a cross-sectional view of FIG. 1A when assembled, taken at 3A—3A;

FIG. 3B is a close-up view of FIG. 3A;

FIG. 6 shows the inner housing and an exploded view of the valve stem (shaft);

FIG. 7 shows an exploded view of the inner housing and assembly of the flappers to the valve stem (shaft);

DETAILED DESCRIPTION

Figure 2:
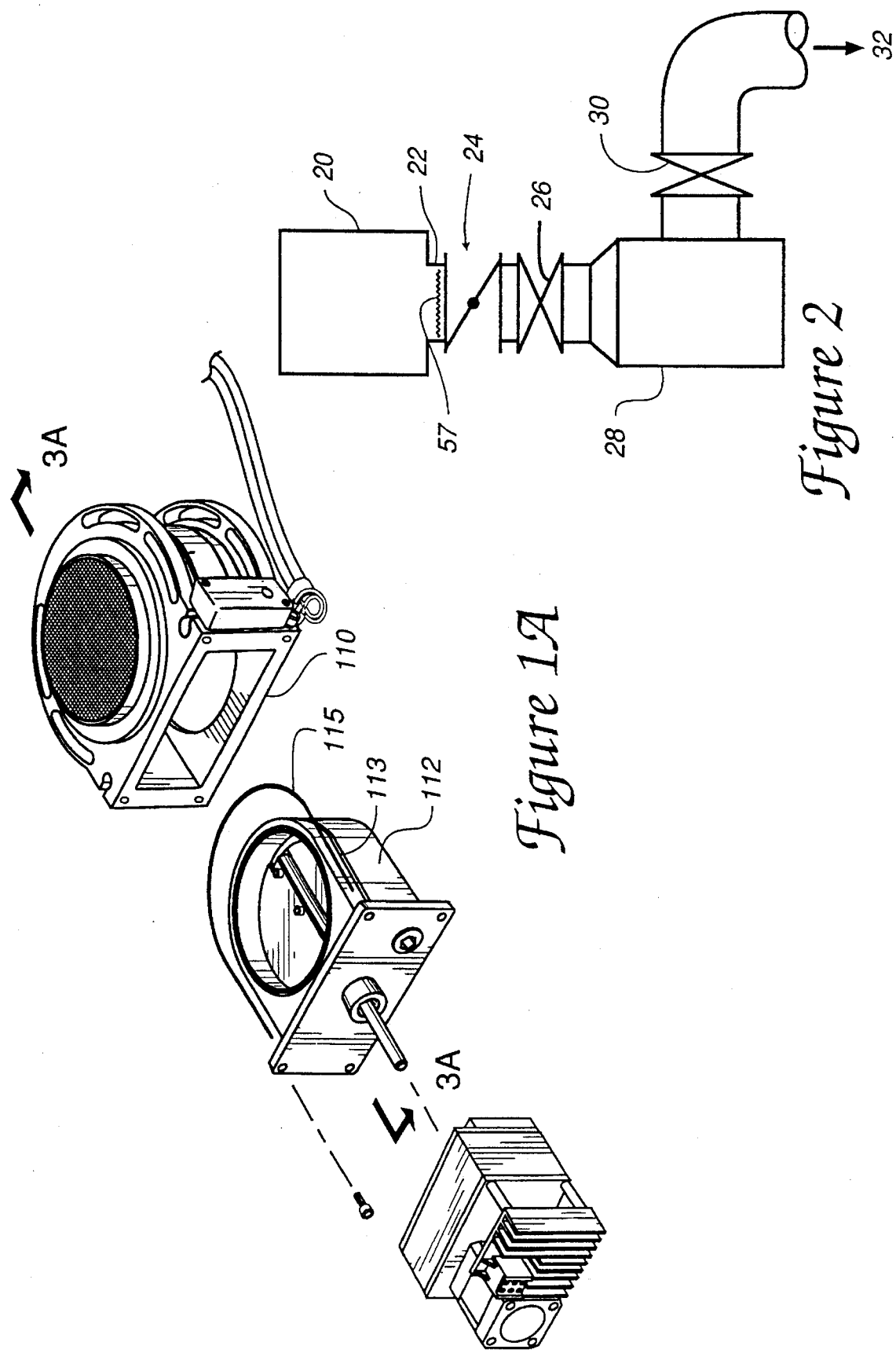
FIG. 2 is a schematic diagram showing the typical location of a heated throttle valve assembly in typical plasma metal etch process vacuum piping.

A typical vacuum piping (pump stack) arrangement from a process chamber 20 in the path piping connecting to the vacuum pumps is shown in FIG. 2. A butterfly-type throttling valve assembly 24 is installed below a screen assembly 57 and above a gate valve 26. The gate valve 26 connects to a turbo-type vacuum pump 28, which connects to an isolation valve 30, which connects to piping leading toward the main vacuum pumps (in the direction of arrow 32).

Figure 1:
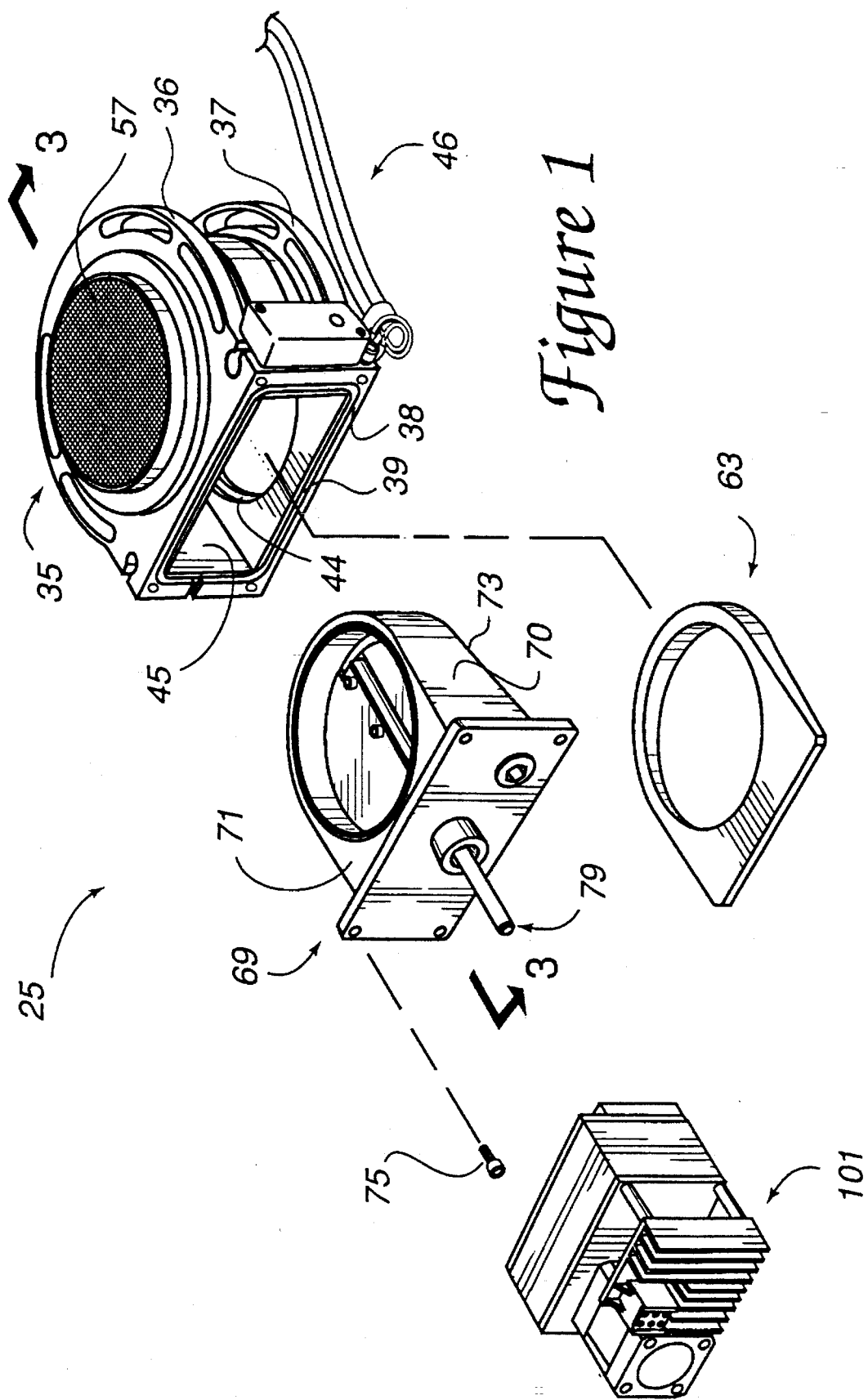
FIG. 1 is an exploded perspective view of a heated throttle valve according to the invention.

In utilizing a configuration according to the invention the valve assembly 24 as shown in FIG. 2 is replaced by a valve assembly 25 as shown in FIG. 1. An exploded view of a throttling valve assembly according to the invention is shown in FIG. 1. The valve assembly 25 consists of the outer housing 35, the inner assembly 69, the wedge 63, the screen assembly 57 and the drive assembly 101.

The stationary outer housing 35 is permanently mounted in the piping (not shown). The inner housing 69 can be removed from the side opening 45 of the stationary outer housing 35 to clean the insides of both the inner housing 70 and the outer housing 35 without disturbing the adjacent piping system. Leaving the outer housing 35 in place avoids having to disturb the adjacent piping components (such as the gate valve 26, turbo pump 28, and isolation valve 30 and flexible exhaust lines 22) that are rigidly attached to the outer housing 35. Any of these components or the valve could be damaged during disassembly and re-assembly. This configuration eliminates the possibility of vacuum leaks created in and between components when their seals are repeatedly broken and re-assembled during cleaning operations.

Figure 3:
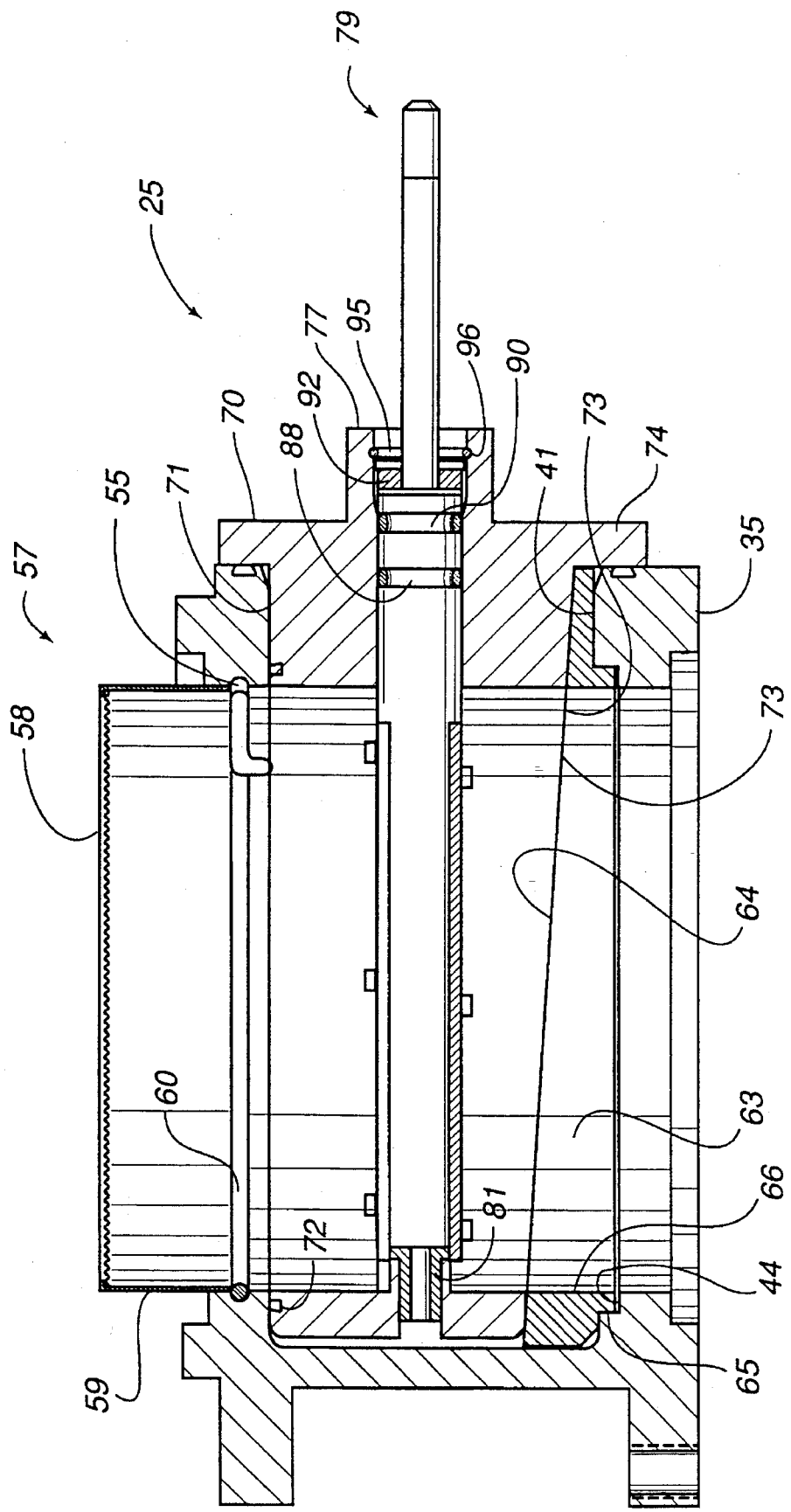
FIG. 3 is a cross-sectional view of FIG. 1 when assembled, taken at 3—3.

The wedge 63 of the assembly 25 is inserted into the stationary outer housing 35 at the bottom (FIGS. 1 and 3). This wedge 63 creates an inclined flat surface (ramp) onto which the inner valve assembly 69 is placed. The inner housing 70 of the inner valve assembly 69 has a flat top surface 71 and a sloped bottom surface 73. The angle of the sloped bottom surface 73 matches the slope of the top of the wedge 63. When the side flange 74 of the inner valve assembly 69 is mated to the side face 38 of the stationary outer housing 35, the sloped bottom surface of the inner housing 70 generally covers the wedge 63. The precise dimensions of the angled pieces create a tight fit between the top and bottom of the outer housing 35, the wedge 63 and the inner housing 70.

As shown in FIG. 3 the stationary outer housing 35 has an inner bottom surface 41. The inner bottom surface 41 has a stepped circular land 44 to seat and locate the wedge 63. The bottom surface of the wedge 63 has a raised flange 65 that fits within and on the circular land 44 in the outer housing 35. The bore 66 of the wedge 63 is aligned with the bore of the outer housing 35 and the removable inner housing 70 to provide a generally continuous uniform cross-sectional bore through the whole assembly 25.

The top surface 64 of the wedge 63 is sloped at a four degree angle matching the sloped four degree bottom surface 73 of the inner housing 70. The top surface 71 of the housing 70 is flat, mating with the flat inner top surface of the stationary outer housing 35. A top surface O-ring groove 72 with an O-ring 78 (FIG. 6) can be provided in the flat top surface 71 of the inner housing 70 around its bore. With or without an O-ring, the tight fit between the top of the inner housing and the flat top inner side of the outer housing provides a tight seal to minimize and/or prevent blow-by. Since this valve functions as a throttling valve and not as a shut-off valve, slight leakage around the inner valve housing is acceptable. However, the clearances in the assembly are tight to provide maximum sealing effect, if not a gas-tight seal. The described configuration is for a butterfly throttling valve, but a similar dual housing arrangement could for be used for a shutoff valve or a different type valve as long as the required sealing between the inner housing and outer housing could be made tight, as required to meet the piping and process requirements.

As can be seen in FIG. 6 the side flange 74 of the inner housing 70 includes an integral valve shaft collar 77 surrounding the valve shaft bore. The valve shaft 79 includes a bushing end portion 80, a flapper portion 83, a seal portion 86 and a drive portion 87. The valve stem (shaft) 79 is supported by a valve shaft end bushing 81 and a valve shaft seal bushing 92. The bushing end portion of the shaft 80 is inserted in the bushing 81 and the shaft is seated in the valve stem hole 82 in the bore of the inner housing 70 supporting the end of the shaft 79. Screw holes 84 are located on both sides of the flap portion 83 of the shaft 79 to attach the top flapper 98 and bottom flapper 99 by using flapper attachment fasteners 100 (FIG. 7). The seal portion 86 of the shaft includes an inner shaft seal groove 88 and an outer shaft seal groove 90. A grommet or O-ring of Kalrez or Chemraz 89 is placed in the inner shaft seal groove 88 and a Viton O-ring with a "quad-seal" profile 91 is placed in the outer shaft seal groove 90. The drive portion 87 of the shaft 79 has a smaller diameter than the seal and flapper portions 86, 83. A valve seal bushing 92 fits over the drive portion and rests against the larger diameter seal portion 86. A wave (spring) washer 93 (to keep the shaft seated) is placed adjacent to the valve shaft seal bushing 93 and is covered by a flat washer 94. A shaft retaining snap ring 95 snaps into a snap ring groove 96 in the valve shaft collar 77 (FIG. 3). A sampling plug 76 provides an opening for instrument sampling connections in the side flange 74.

Figure 4:
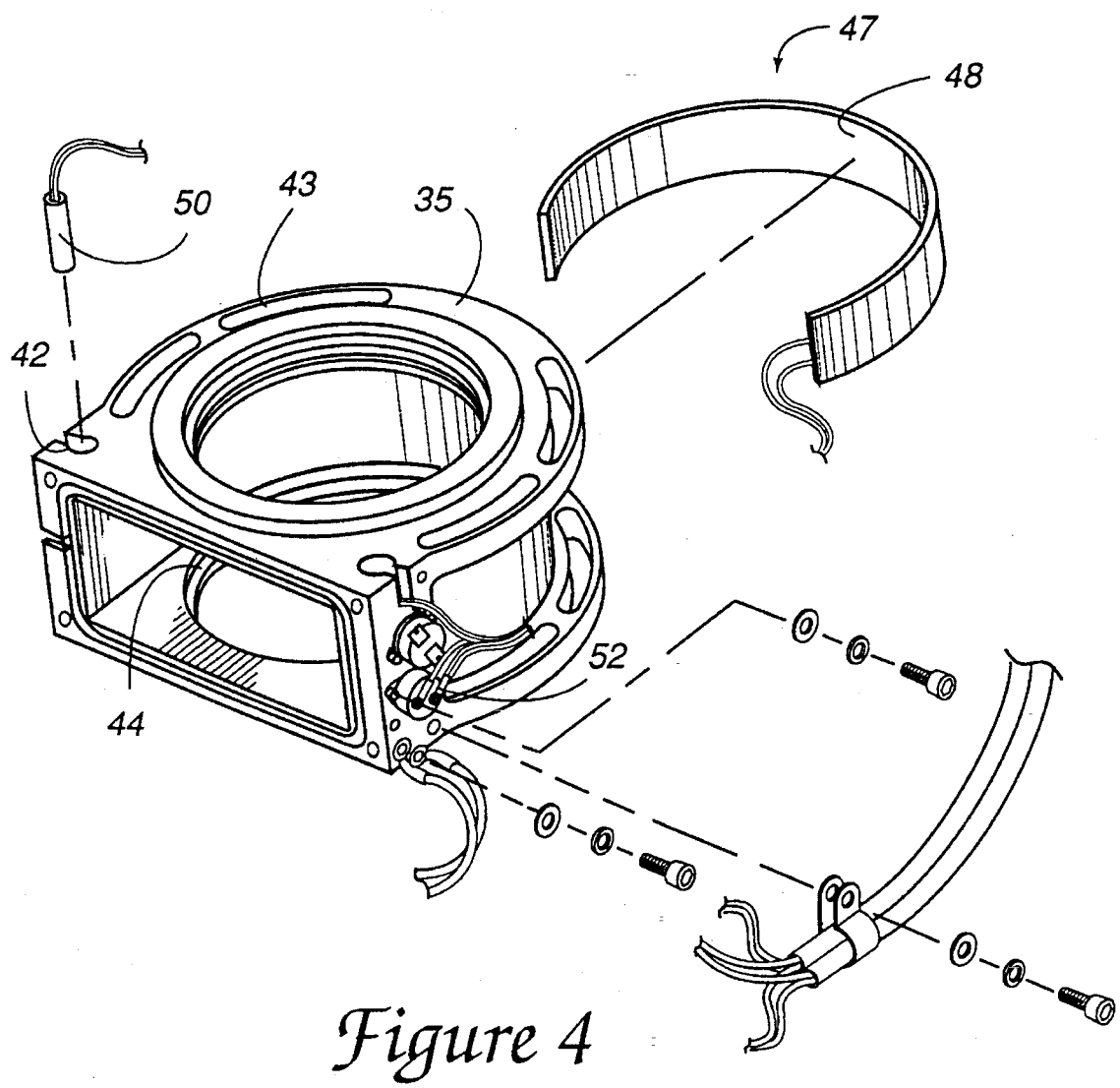
FIG. 4 shows the heating elements and sensors to be attached to the outer housing.
Figure 5:
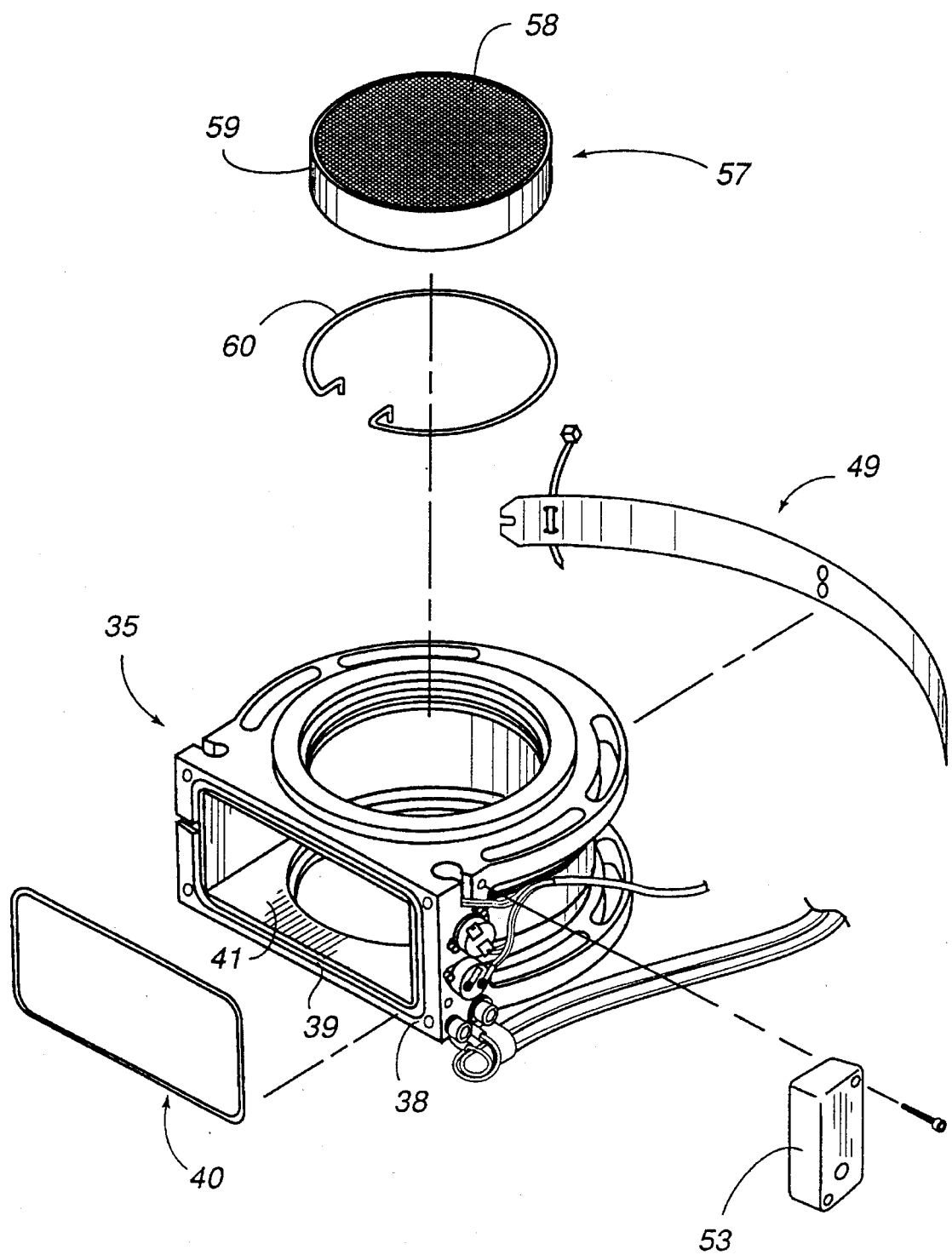
FIG. 5 shows the outer housing with the screen assembly.

The stationary outer housing 35 is heated from the outside by a heater assembly 46 (FIGS. 4,5). The heater assembly includes a heater pad 47 having adhesive backing 48 on its inside surface which is directly attached to the outside of the housing between the top and bottom flanges of the outer housing 35. A pair of cartridge heaters 50 (only one shown) are located in cartridge heater openings 42 to heat and maintain the temperature of the metal mass of the outer housing (plug) between the pipe valve bore and the side face 38. The cartridge heaters 50 and the heater pad 47 are controlled by a thermostat controller (not shown) and an overtemperature switch 52. A heater cover 49 covers the heater pad 47 and a switch cover 53 covers the overtemperature switch 52.

The temperature at the outside of the throttle valve assembly is maintained at about 106° C. Tests have shown that the valve flappers 98, 99 are principally heated by radiant heat transfer from the outer housing and that flapper temperature is a direct function of the temperature of the adjacent piping components and equipment, e.g., the chamber body and the gate valve. For example, with the chamber temperature at approximately 80° C., the gate valve temperature at approximately 95° C., the turbo pump temperature at approximately 80° C. and the outer throttling valve temperature at approximately 95° C., the flapper temperature is maintained at approximately 85° C. which prevents or reduces the rate of polymer deposition on the flapper surfaces and the inside surfaces of the throttle valve assembly.

The radial spacing (gaps) between unmated sections of the inner housing and the outer housing is approximately 0.020 in. (0.5 mm), but since heating of the inner housing is by conductive transfer of heat through mating surfaces as well as radiant heating across these gaps, the size of the gaps does not significantly affect the temperature gradient from the outside to the valve's inner surfaces.

The side face 38 of the stationary outer housing 35 includes a side vacuum seal groove 39 into which an O-ring 40 can be placed such that when the inner side of the side flange 74 of the inner housing 70 is mated against the side face 38 of the outer housing 35 there is a vacuum tight seal. Four screws 75 connect the two. For removal, only four screws need to be removed and this single vacuum seal breached to remove the inner housing assembly 69 and gain access to the flapper portion 83 of the valve shaft 79 and flappers 98,99 for cleaning and maintenance as well as gaining access to the screen assembly 57.

A screen assembly 57 is located in the top bore of the outer housing 35. The screen assembly 57 consists of a screen skirt 59 and a perforated section 58. A retaining ring groove 55 in the top inner bore of the stationary outer housing 35 receives a screen retaining ring 60 to support the screen assembly 57.

Figure 8:
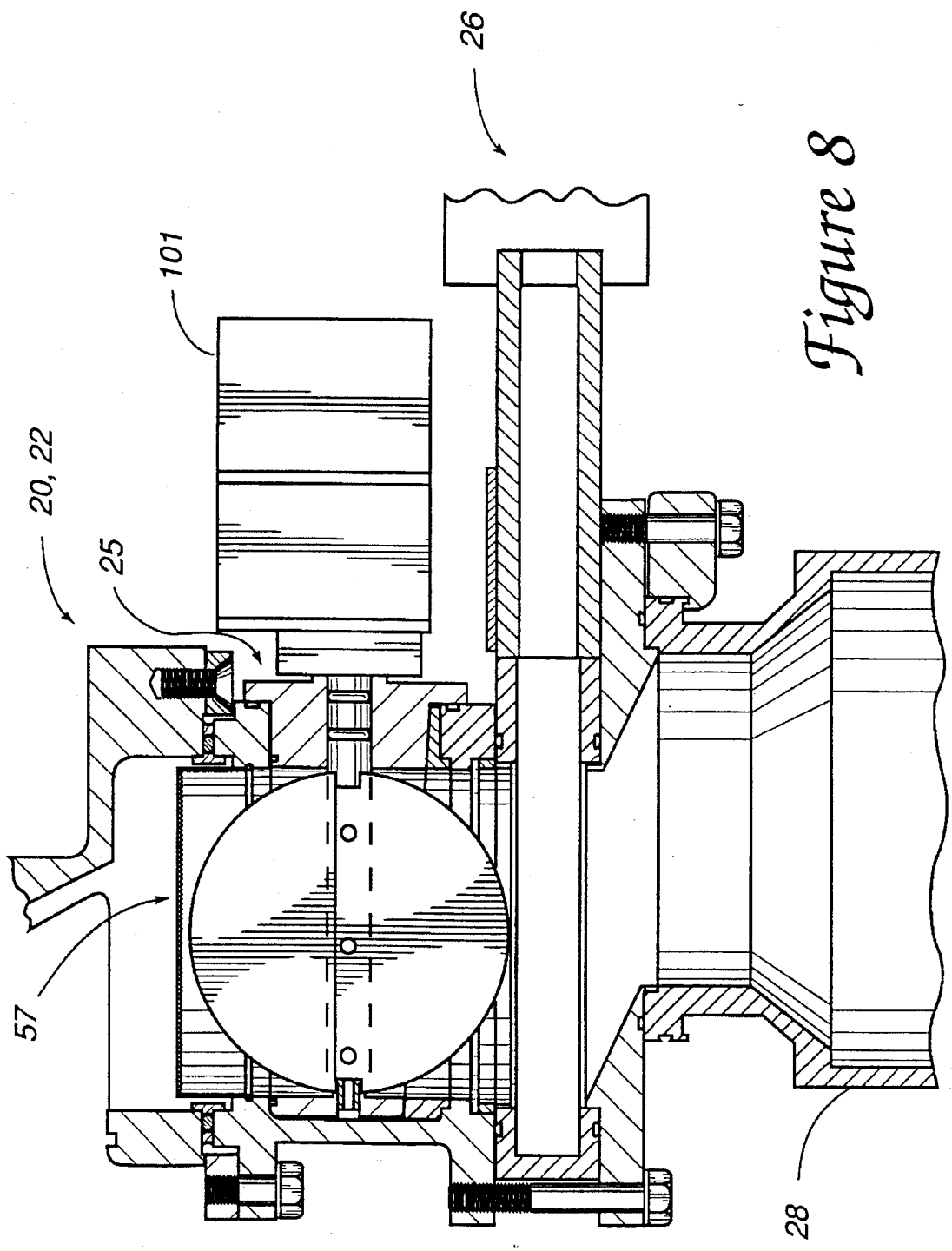
FIG. 8 shows a cross-sectional view of the heated throttling valve according to the invention as it might appear installed in piping (pump stack) between the processing chamber and vacuum pumps.

FIG. 8 shows the valve assembly 25 in place above the gate valve 26. The flappers are shown fully opened. The extreme top and bottom portions of the flappers extend beyond the top surface and bottom flange surfaces of the outer housing 35. The screen assembly's skirt 59 raises the perforated section 58 of the screen out of reach of the valve flappers 98,99.

A valve shaft drive assembly 101 is attached to the valve stem/shaft 79 to rotate the valve shaft 79 and control its throttling function.

FIGS. 1A, 3A, 3B, 9, 9A, and 10 present an alternate embodiment of the invention. In this embodiment an outer housing 110 has parallel top and bottom inside surfaces, but no land is provided in its inside bottom surface to receive a wedge. In this embodiment no wedge is used. The sealing around the inner housing is done between the side (radial) face of an inner housing 112 and its facing surface on the inside of the outer housing 110. A seal retention groove 113 receives an open ended O-ring 115 (other cross section flexible sealing members and corresponding grooves can be used). When fully inserted the thickness of the O-ring 115 is compressed to provide a tight seal around the side face and arc of the inner housing. While the side face is parallel on the two vertical sides adjacent to flange of the inner housing, a gradual taper to the area surrounding the circular bore is an alternate configuration so that the side O-ring is not ripped or unduly stretched by the insertion of the inner housing into the outer housing until the last ¼ inch (6.35 mm) of final travel as pressed tight by the flange sealing screws.

FIGS. 3 and 3A show the location of the sealing structures (O-rings) as they are retained in seal retaining grooves in the side and inside face of the sealing flange. The open ended O-ring 115 is retained in the O-ring retaining groove 113.

Figure 9:
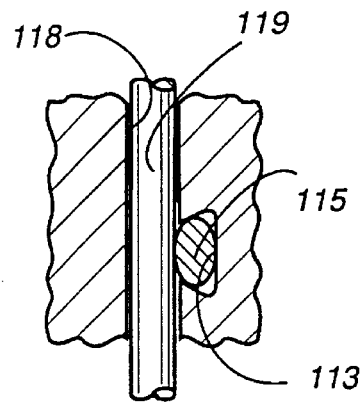
FIG. 9 shows a cross section of FIG. 3A taken at 9—9, with a close-up view of the seal crossing at the face of the inside of the flange of the inner housing.
Figure 10:
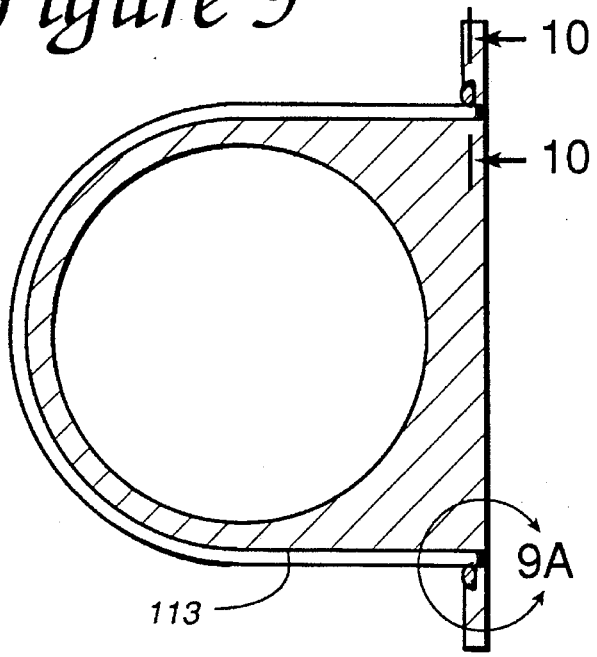
FIG. 10 is a cross section of FIG. 9 taken at 10—10.
Figure 9A:
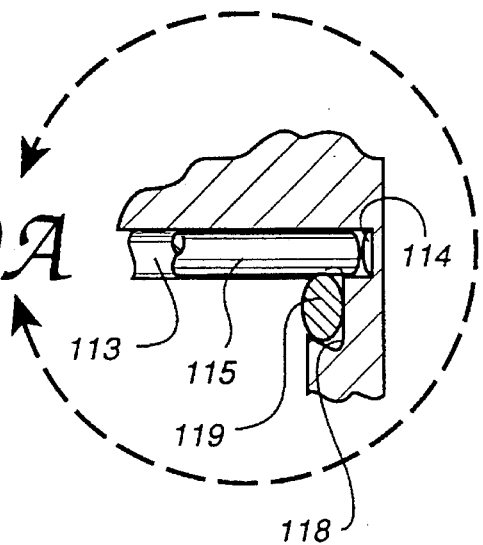
FIG. 9A is a close-up view of FIG. 9 taken at 9A—9A.

FIGS. 9, 9A, and 10 show close-up views of the end detail of the open ended O-ring 115 and groove 113 as it meets the inside face of the sealing flange and the O-ring 119 and continuous ring sealing groove 118. The open ended sealing groove 113 ends in a seal termination hole (cavity) 114. The path of the two sealing O-rings (open ended and ring) 115, 119 and their respective retention grooves 113, 118 are such that the two seals touch each other in crossing, and when the inner 112 and outer housings 110 are clamped together the compression of the O-rings on each other reduces the chance of leakage around the free ends of the open ended O-ring seal. The seal termination hole 114 provides a space into which the compressed O-ring can expand when compressed. The O-rings' ability to seal between the inner and outer housing depends on material properties of the O-ring and the amount of compressive force that can be maintained throughout the required process cycles. Differential thermal expansion due to temperature gradients must also be taken into account.

All wetted parts are made of anodized aluminum which is compatible with the chemical environment present during semiconductor wafer processing. Parts exposed to the process gas which are not made of anodized aluminum are: the valve shaft 79, the valve flappers 98,99, the flapper attachment screws 100, the screen perforated section 58, and the screen skirt 59; and all are made of 304SS (Stainless Steel).

While the invention is described with regard to specific embodiments, those skilled in the art will recognize that changes can be made in form and detail without departing from the spirit and scope of the invention. The examples described herein are merely representative of the invention and should not be considered to limit the scope of the invention to the structure or method herein described.

We claim:

1. A valve comprising:

an outer housing having a fluid flow bore therethrough, a side opening, and a top inner surface generally parallel to a bottom inner surface;

a wedge having a fluid flow bore therethrough configured to be supported on said bottom inner surface of said outer housing, said wedge being tapered at a first predetermined angle;

an inner housing having a fluid flow bore therethrough, said inner housing having a top side and a bottom side, wherein said bottom side is tapered with respect to said top side at said first predetermined angle, when said inner housing is placed in said outer housing said wedge is in contact with said bottom tapered side of said inner housing, said fluid flow bore of said inner housing having an adjustable flow restricting barrier therein, such that when said inner housing is disposed so as to seal said side opening of said outer housing, said fluid flow bore of said outer housing communicates with said fluid flow bore of said inner housing such that there is a substantially tight fit between said inner housing and said outer housing to substantially prevent the passage of fluid through said fluid flow bore of said outer housing without the fluid also passing through said fluid flow bore of said inner housing.

2. A valve as in claim 1, wherein said flow restricting barrier is adjustable by means of a valve stem supported and sealingly passing through a plug portion of said inner housing.

3. A valve as in claim 2, wherein an outside surface of said outer housing is heated.

4. A valve as in claim 2, wherein said flow restricting barrier is a butterfly type valve having a valve stem with flappers.

5. A valve as in claim 2, further comprising a screen assembly in said fluid flow opening of said outer housing, said screen assembly being supported adjacent to said inner housing in said fluid flow opening by a screen support assembly, said screen assembly being removable from and replaceable in said outer housing through said side opening when said screen support assembly is adjusted to release its support of said screen assembly.

6. A valve as in claim 5, wherein said screen support assembly comprises a groove in said bore of said outer housing for partially receiving an elastic retaining wire therein, said screen assembly comprising a hollow cylindrical skirt portion supporting a perforated portion at its periphery, wherein an outer diameter of said skirt portion is less than the bore diameter of said outer housing and is greater than an inner diameter of said elastic retaining wire when said wire is disposed in said groove.

7. A valve comprising:

an outer housing including an outer housing bore therethrough for the flow of fluid, said outer housing including a side opening for receiving an inner housing, said inner housing including a hollow cylindrical passage containing a flow restricting barrier connected to a valve stem supported by and passing through said inner housing, said inner housing having a generally flat top surface and a generally flat bottom surface, said bottom surface being tapered with respect to said top surface at a predetermined angle from said top surface;

a wedge plate disposed within said outer housing, said wedge plate including a generally flat sloped surface whose angle matches said predetermined angle of said inner housing bottom tapered surface and having a wedge bore therethrough, said wedge bore forming part of the fluid path through said outer housing;

wherein when said inner housing is disposed within said outer housing and said inner housing seals said side opening, said inner housing tapered surface is mated tightly with said flat sloped surface of said wedge plate and said cylindrical passage forms part of the fluid flow passage through the outer housing, where the centerline of the cylindrical passage is generally coincident with a centerline of said outer housing bore and a center line of said wedge bore.

8. A valve as in claim 7, further comprising a heating system applying thermal energy to an outside surface of said valve.

9. A valve comprising:

an outer housing having a fluid flow bore therethrough, said outer housing having an inner top surface and a inner bottom surface, wherein said inner top surface is generally parallel to and opposite from said inner bottom surface, where said inner top and said inner bottom surfaces are separated by a first predetermined distance, said fluid flow bore extends through said inner top surface and said inner bottom surface, said outer housing having a side opening;

an inner housing having an flat top surface and a flat bottom surface generally parallel to one another where said flat top and said flat bottom surfaces are separated by distance slightly smaller than said first predetermined distance, said inner housing having a fluid flow bore therethrough, said inner bore being sealingly fitted in said side opening of said outer housing, said fluid flow bore extends through said flat top surface and said flat bottom surface, said inner housing and said outer housing being configured so that said inner top surface faces said flat top surface and said inner bottom surface faces said flat bottom surface, and is configured to prevent fluid flow through said outer housing fluid flow bore and around the inner housing;

an adjustable flow restricting barrier within said inner housing fluid flow bore, such that the restriction of fluid flowing through said flow bore of said inner housing is adjusted according to the position of a restriction mechanism;

an inner housing having a fluid flow bore therethrough, said inner bore being sealingly fitted in said side opening of said outer housing, said inner housing and said outer housing being configured to prevent fluid flow through said outer housing fluid flow bore and around the inner housing;

an adjustable flow restricting barrier within said inner housing fluid flow bore, such that the restriction of fluid flowing through said flow bore of said inner housing is adjusted according to the position of a restriction mechanism;

wherein said outer housing has an inner top surface generally parallel to an inner bottom surface, wherein said inner housing has a generally flat top surface and a generally flat bottom surface said top and bottom surfaces being tapered at a predetermined angle to one another; wherein said valve further comprises a wedge placed between said inner bottom surface of said outer housing and said tapered bottom surface of said inner housing; said inner housing, said wedge, and said outer housing being configured such that when said inner housing is sealingly located in a position in said outer housing, said inner housing is substantially fixed in said outer housing between said wedge and said inner top and bottom of said outer housing.

10. A valve as in claim 9, wherein said flow restricting barrier is connected to a valve stem passing through said inner housing, said inner housing having a seal structure, said seal structure comprising an inner seal having a predetermined chemical resistance and an outer seal having a chemical resistance less than said predetermined chemical resistance of said inner seal.

11. A valve as in claim 10, wherein said inner seal structure includes an O-ring groove containing an O-ring made of a material with a high chemical resistance such as Kalrez or Chemraz;

wherein said outer seal structure includes an O-ring groove containing an O-ring made of a material having a chemical resistance less than a material such as Kalrez or Chemraz, such as Viton.

12. A valve as in claim 9, further comprising a heating system applying thermal energy to an outside surface of said valve.

13. A valve comprising:

an outer housing having a fluid flow bore therethrough, said outer housing having a side opening;

an inner housing having a fluid flow bore therethrough, said inner bore being sealingly fitted in said side opening of said outer housing, said inner housing and said outer housing being configured to prevent fluid flow through said outer housing fluid flow bore and around the inner housing an adjustable flow restricting barrier within said inner housing fluid flow bore, such that the restriction of fluid flowing through said flow bore of said inner housing is adjusted according to the position of a restriction mechanism;

wherein said outer housing has an inner top surface generally parallel to an inner bottom surface, wherein said inner housing has a generally flat top surface and a generally flat bottom surface said top and bottom surfaces being tapered at a predetermined angle to one another; wherein said valve further comprises a wedge placed between said inner bottom surface of said outer housing and said tapered bottom surface of said inner housing; said inner housing, said wedge, and said outer housing being configured such that when said inner housing is sealingly located in a position in said outer housing, said inner housing is substantially fixed in said outer housing between said wedge and said inner top and bottom of said outer housing.

* * * * *